May 5, 1959 P. EISLER 2,885,524

ELECTRIC RESISTANCE DEVICES

Filed Aug. 26, 1953 2 Sheets-Sheet 1

Inventor
PAUL EISLER
By Frederick E. Hare
Attorney

May 5, 1959 P. EISLER 2,885,524

ELECTRIC RESISTANCE DEVICES

Filed Aug. 26, 1953 2 Sheets-Sheet 2

Inventor
PAUL EISLER
By Frederick E. Hane
Attorney

United States Patent Office 2,885,524

Patented May 5, 1959

2,885,524

ELECTRIC RESISTANCE DEVICES

Paul Eisler, London, England, assignor to Technograph Printed Circuits Limited, London, England, a company of Great Britain Application August 26, 1953, Serial No. 376,711

Claims priority, application Great Britain August 28, 1952

5 Claims. (Cl. 201—73)

This invention relates to electric resistance devices of the kind comprising a generally flat and thin ribbon-like metallic resistance element of comparatively high and accurately determined ohmic value, carried by an insulating base. An important application of such resistance devices is as gauges, in which a change in the ohmic resistance serves as an indication of, or as a controlling influence dependent upon, a change in some variable which affects the ohmic resistance. This variable may be, for instance, a temperature to which the gauge is subjected, or the strain of some body to which the gauge is secured.

There are many problems in the production of such electric resistance devices. For instance in my U.S. Patents Nos. 2,441,960 and 2,587,568, and application Serial No. 191,629, issued as Patent No. 2,662,957, various aspects of making these and other devices by creating suitable patterns from metal foil have been described, and the present invention is concerned with further improvements in such devices and in techniques for their production, where the resistance element is made by patterning a metal foil.

The following problems are among the more important encountered in the manufacture of such devices.

(1) Owing to the thickness the foils of suitable metals available commercially at the present time the resistance element would have to be made so narrow in relation to its length, if a reasonably high ohmic value is to be achieved, that the rate of rejects in production would be unduly high. Moreover, even if thinner foils were available they would be so fragile that they would be difficult to handle.

(2) Owing mainly to inequalities in foil thickness, ordinary processing techniques without exceptionally stringent controls would produce the bulk of the components having a spread of ohmic values considerably beyond the narrow permitted tolerance.

(3) The wide range of users' requirements as to design features and fields of application of the resistance devices, often wanted quickly and in only comparatively small quantities at a reasonable price, pose the problem of devising a production technique which has an inherent flexibility while still allowing a considerable uniformity of operation.

(4) The production of resistance devices having a common general specification which is sufficiently flexible to permit the manufacture of a very wide range of devices within this specification, to satisfy the wide variety of users' requirements.

It is an object of the invention to provide a solution to the specific problems mentioned above.

Broadly speaking, the invention comprises subjecting the metal foil to a metal removing treatment in addition to the patterning treatment in which unwanted parts of the metal foil are removed.

Although it is not possible to use the same metal foils, the same designs and exactly the same specifications for all the different forms of electric resistance devices and for satisfying all the various requirements which such devices have to meet in their various fields of application, the invention provides a general solution to the various problems encountered. Obviously, the various metal foils to be used and the different specifications to be complied with impose variations in the detailed application of the invention. Nevertheless, it will be apparent from the following examples that the same basic feature of the invention underlies all the different variations. The examples are described with reference to the accompanying drawings, in which:

The physical characteristics of the devices will first be described, followed by details of how they may be produced in accordance with the invention.

Figure 1:
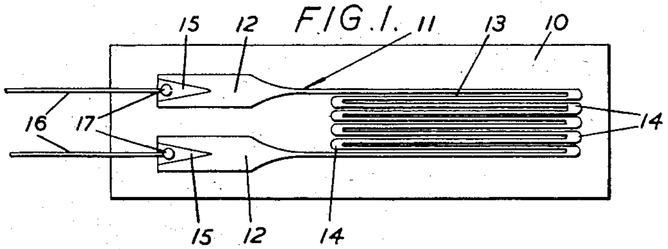
Figure 1 is a plan view of a strain gauge produced according to the invention.

The strain gauge shown in Figure 1 comprises an insulating base 10 which is thin and deformable and which can be secured to the body to be tested. The base 10 preferably has an adhesive quality, enabling it to be easily stuck in place. Alternatively, it may be fixed by an applied adhesive or by bonding or by some other similar means. The base 10 preferably comprises a solidified layer of lacquer, as hereinafter explained. An epoxy resin lacquer such as an "Araldite" lacquer is particularly suitable because it is a good electrical and heat insulator, it is flexible and strong, it can withstand high temperatures, and it is compatible with numerous adhesives suitable for attaching it to metal.

Secured in the upper surface of the base 10 is a conductive pattern 11. This comprises two relatively wide terminal areas 12 and, extending between them, a narrow ribbon-like conductive path 13 which doubles back and forth several times as a grid-like array of spaced lengths which are geometrically parallel but are electrically connected together in series by end portions 14. The extent of these end portions in the direction parallel to the ribbon-like lengths 13 is preferably several times the width of the individual ribbons, so that the resistance value of the whole conductive path is affected only by longitudinal strains, any transverse strains which the gauge may experience causing no significant alteration in the resistance value.

Changes in width of the conductive pattern, from the narrow ribbon-like lengths 13 to the wide terminal areas 12 and to the end portions 14, are accomplished by smooth transition curves, to avoid sharp corners which might produce localised high stress concentrations conducive to the formation of cracks in the pattern. Similarly, the outer edges of the end portions 14 are rounded.

All parts 12, 13 and 14 of the conductive pattern 11 are formed from a single sheet of metal foil by removing unwanted portions therefrom, as hereinafter described.

Where the conductive pattern is very thin it is sometimes desirable to provide relatively thick reinforcing patches 15 in contact with the terminal areas 12, to which lead-in conductors 16 can be soldered with blobs of solder 17.

As shown, the reinforcing patches 15 are preferably wedge-shaped in order that there shall be a progressive change-over of current flow from the reinforcing patches 15 to the terminal areas 12, and vice versa. The transition in thickness should also be smooth, in order to minimize differential stresses in the terminal areas. The etching treatment to be described later provides this smooth transition by virtue of the undercutting of the edges of the patches 15 which is produced by the etching.

Figure 2:
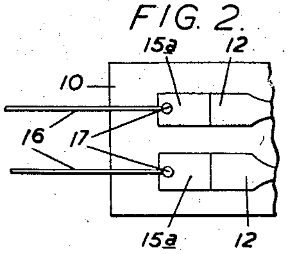
Figures 2, 3 and 4 show alternative forms of terminals for the strain gauge of Figure 1.
Figure 3:
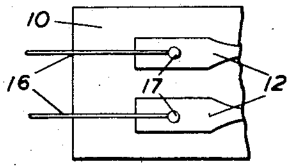

Alternatively, as shown in Figure 2, the patches 15*a* may end with an edge at right-angles to the main axis of the pattern, in which case there will be a rather more abrupt change-over in current flow from the reinforcing patches 15*a* to the terminal areas 12.

Where the conductive pattern 11 is sufficiently thick the reinforcing patches may be dispensed with, and the lead-in conductors 16 soldered directly to the terminal areas 12 as shown in Figure 3.

Figure 4:
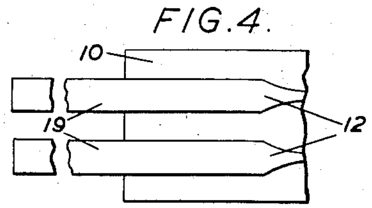

Alternatively, with a conductive pattern 11 of sufficient thickness, the terminal areas 12 may be extended beyond the base 10, these extensions 19 constituting the lead-in conductors, as shown in Figure 4. If desired these extensions may be integral parts of a printed circuit of any required complexity, and of which the gauge is a component.

Figure 5:
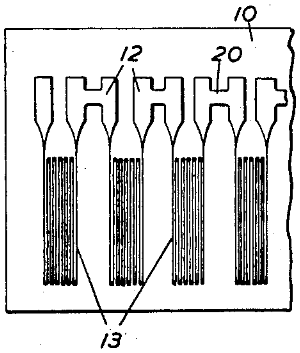
Figure 5 is a plan view of one end of a multiple gauge of strip form.

As shown in Figure 5, individual strain gauge units may be manufactured side-by-side on a continuous strip. If conductive bridges 20 are provided between the adjacent strain gauge units, as shown, it is possible to have a multiple gauge assembly consisting of two or more strain gauge units disposed side-by-side on the same surface to be tested.

Figure 6:
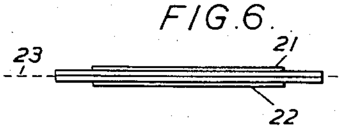
Figure 6 is a side view of a back-to-back assembly of strain-sensitive devices for detecting bending stresses.
Figure 7:
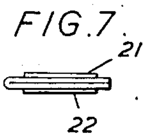
Figure 7 is an end view of the arrangement shown in Figure 6.
Figure 8:
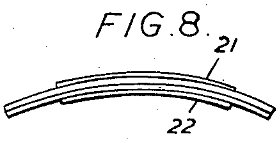
Figure 8 is a view similar to Figure 6, showing the assembly when stressed.

As shown in Figures 6 and 7, two strain gauge units 21 and 22 are folded back-to-back so as to lie on opposite sides of a neutral plane 23. Then by bending the composite device thus formed, as shown exaggerated in Figure 8, a differential change of electrical resistance between the individual gauge units 21 and 22 occurs. If more than one pair of gauge units are provided, the differential change of resistance will occur between the individual gauge units of each pair, thus increasing the total differential change of resistance.

Instead of fastening two gauge units together back-to-back, a body to be subjected to bending may be sandwiched between them; for instance, a flexible leaf for supporting the needle in a gramophone (phonograph) pick-up.

Figure 9:
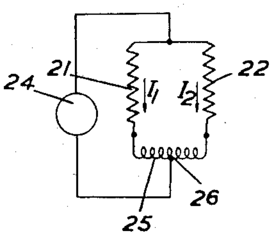
Figure 9 is a circuit diagram of strain-sensitive devices arranged as a gramophone (phonograph) pick-up.

If the strain gauge units which are subjected to the differential change of resistance are connected in a bridge net-work, a very sensitive device results. For instance, if the strained body is a leaf which carries at one end the needle of the pick-up and has its other end anchored in the pick-up body, and if one end of one strain gauge unit 21 (Figure 9) is connected to one end of the other unit 22 and to one pole of a source of current 24, and if the other ends of these gauge units are connected across the speech coil 25 of a loud-speaker, which coil has a centre tapping 26 connecting it to the other pole of the source of current 24, the device can actuate the speaker without any amplification. Thus, when the leaf is in a neutral position, the resistance values $R_{21}$ and $R_{22}$ of the two strain gauge units will be equal, and the current $I_1$ flowing through one half of the speech coil in one direction will be equal to the current $I_2$ flowing through the other half in the opposite direction. The vector sum of the currents in the whole speech coil is thus zero. If, now, the leaf is deflected to increase the resistance value of the gauge unit 21 and to decrease the resistance value of the gauge unit 22, then the value of $I_1$ will be reduced but the value of $I_2$ will be increased.

Thus, $I_1$ and $I_2$ will be no longer be in balance and the effect will be as if a current $I_2$—$I_1$ were flowing through the speech coil 25. By making $I_2$—$I_1$ sufficiently large, therefore, the speaker can be operated without amplification of the speech coil current.

Since the conductive paths of the gauge units 21 and 22 can be made very thin, they can have a much larger surface area to volume ratio than is obtainable with a wire. Thus, the conductive paths will readily dissipate heat, and in consequence relatively high current loadings can safely be used; much higher than in any form of strain gauge of similar overall dimensions and sensitivity hitherto known. This property of high current capacity sometimes enables amplification to be dispensed with. For instance, in some applications the current readings can be observed directly on an instrument such as a milliameter, without amplification.

The principle described above is, of course, not confined to the direct actuation of loud-speakers, since this merely represents one example of a mechanical-electrical relay of high sensitivity and high output to which the invention is applicable. Another example is a microphone where the body is distorted by sound waves impinging on it.

Figure 10:
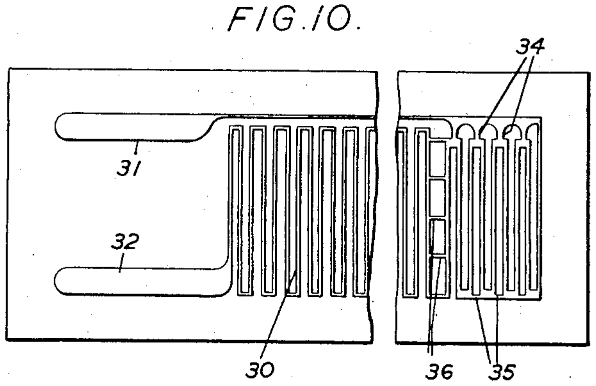
Figure 10 is an arrangement of a temperature indicating or control device.

Another electric resistance device to which the invention can be applied is the temperature indicating or control device shown in Figure 10, in which there is a long electrical resistance path 30 extending between terminal areas 31 and 32. Changes in temperature to which this path is subjected effect its resistance value, the metal of the resistance path being one having a high and reliable resistance change-temperature coefficient over the desired range. Platinum or nickel for instance are suitable metals for this purpose.

As will be explained in more detail later, in certain devices made in accordance with the invention it is desirable to provide a fine adjustment for the basic resistance value of the device, and for this purpose an arrangement such as that shown in the right-hand part of Figure 10 can be employed. In this case an extension 33 of the resistance path has its ends connected together by bridges 34 and 35 which can be severed by cutting or punching out. The device is made with a resistance value slightly less than the basic value required, and the bridges 34 and 35 are severed one by one until the resistance has been raised to approximately the required basic value. Final adjustment can be made by severing the bridges 36 one by one, thus bringing further partial lengths of the resistance path into use.

Figure 11:
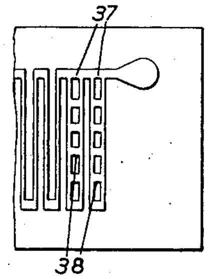
Figures 11 and 12 show alternative forms of end for resistance devices in which provision is made for fine adjustment of the basic resistance value.
Figure 12:
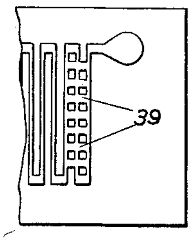

Alternative arrangements are shown in Figures 11 and 12, in which case severing the bridges 37, 38 and 39 increases the resistance value. This system of fine adjustment can be applied to any resistance devices of the general kind described.

As indicated above, the resistance pattern of all the devices described is made from metal foil. In general, single layer metal foils which are commerically available are of such thickness that, for a resistance path of comparatively high ohmic value and of reasonable length, the width might have to be impracticably small. Therefore in one technique according to the invention, the foil, before or after the creation of the desired pattern in any suitable manner such as by one of the foil patterning methods described in my aforementioned U.S. patent specifications, is thinned down by a metal removing treatment. Such treatment may comprise, for instance, a polishing process such as electro-polishing, or, preferably, an etching process. It has been found that in some cases with an etching process an increase in ohmic value of as much as 150% can be achieved without sacrifice of reliability or accuracy. The process is controlled so as to produce any desired increase in ohmic value, provided the required limit of accuracy is not overstepped. Control of the etching process can be achieved by controlling the time of the process and the strength of the etching medium. Subsequently a fine adjustment of the resistance value of the pattern may be made, either in the sense of a further increase in the value by an expedient such as those described with reference to Figures 10, 11 and 12, or in the sense of a decrease in the value by tinning over a selected part or parts of the pattern. This has the effect of thickening these parts of the pattern and so reducing the resistance, or, if two adjacent parts of the pattern are close enough together, of bridging these parts and so short-circuiting some of the pattern. The former method of fine adjustment is more suitable where the resistance device is likely to be subjected to high temperatures, or where it is to be used in conjunction with media which are incompatible with the materials of the solder or the like used for the tinning.

Another variation of the production technique according to the invention involves the use of a bimetal foil. The pattern is formed in one layer of the foil, the other layer being either entirely removed by the metal removal treatment, or removed almost entirely, leaving only small reinforcing patches secured to the pattern where desired. The patches 15 in Figure 1 and **15*a*** in Figure 2 may be formed in this way.

The bimetal sheet may be made in several ways. For instance, it may be made by a roller cladding process in which two blocks of metal are united together and rolled out thin. The two metals should be matched so that they will roll out together easily, and can be united at their common surface without forming too thick a diffusion zone. The diffusion zone can usually be kept to a minimum by applying one metal to a sheet of the other metal by electrodeposition. It is preferred to use the metal of the said sheet for the formation of the resistance pattern. Once a sufficient covering of the electro-deposited metal has been achieved the thickness of this metal can be built up by more rapid methods, if preferred. Suitable bimetals are, for instance, a noble metal such as gold or platinum on a copper base, or a noble metal alloy on a copper base. For resistance devices which are to be used as standards and which should not suffer significant change in ohmic value when subjected to strain or temperature variations, a suitable alloy is gold and 2½% chromium. A bimetal suitable for strain gauge purposes is a nickel-copper alloy on an iron base. A bimetal made by roller cladding, wherein the pattern layer is a sufficiently pure metal or alloy, is particularly suitable for the manufacture of strain gauges and the like, and devices sensitive to temperature changes. In the case of strain gauges and the like, it is preferred to align the length of the resistance path with the grain of the rolled bimetal. Other methods of making the bimetal are also suitable, for instance, electro-deposition of a thin film of one metal on a much thicker foil of the other metal.

One method of performing the invention using a bimetal sheet will now be described with reference to Figures 13 to 16.

Figure 13:
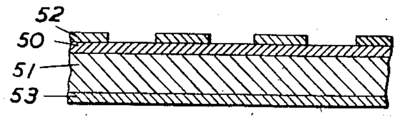
Figures 13 to 16 show various stages in one method of manufacturing devices according to the invention.

The bimetal foil shown in Figure 13 consists of a thin layer 50 of a metal such as gold or a gold alloy upon the surface of another metal layer 51, for instance copper.

For preparing the desired pattern in the layer 50 various methods may be used, such as chemical etching, electrolytic etching, or the spark erosion process described in U.S. patent application Serial No. 369,832 of the present applicant and Erwin Hauser, filed July 23, 1953 now Patent 2,785,280.

Figure 14:
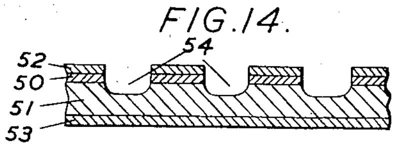
Figure 15:
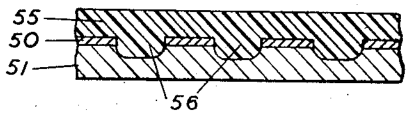

If an etching process is used, a resist pattern 52 is applied over the layer 50 and the opposite surface of the copper layer 51 is protected by another complete layer of resist material 53. This stage in the method is shown in Figure 13. The material is then subjected to the etching treatment. This eats into the metal which is not protected by the resist pattern, leaving cavities 54 as shown in Figure 14. Next, the resists 52 and 53 are removed, for instance by suitable solvents. After this, a layer of lacquer 55, preferably an epoxy resin lacquer as mentioned above, is applied over the etched surface. Portions 56 of the lacquer fill the cavities 54 as shown in Figure 15.

Figure 16:
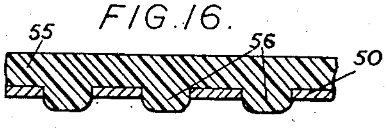

After this the material is subjected to a metal removing treatment such as another etching treatment using a medium which will attack the layer 51, but not the metal 50. Alternatively, a spark erosion process may be used for this step also. This has the effect of removing the metal 51, as shown in Figure 16, to leave the desired pattern 50 embedded in a layer of lacquer 55. The portions 56 of the lacquer which penetrated the cavities 54 now project proud of the exposed surface of the metal pattern 50 and serve to protect it. They also improve the adhesion of the metal pattern to the lacquer layer, by filling the interstices between the arms of the resistance path.

It it is desired to provide reinforcing patches such as 15 (Figure 1) or **15*a* (Figure 2) on the terminal areas, this can be done by providing a suitable resist pattern on the exposed side of the metal of the layer 51** during the metal removing treatment, where areas of this metal are to be retained.

When the conductive pattern has been formed in the base it may be protected, for instance with an insulating lacquer film which covers the whole external surface except at places where electrical connections have to be made. The terminal areas may be protected, after the connections have been made, by laying on a strip of impregnated paper over the pattern and bonding this strip to the base material. This protective strip should not cover the sensitive portion of the device.

In some instances, in strain gauges particularly, it is preferred to leave the sensitive portion of the device as bare metal with no protecting insulation at all. This is essential in transfer-type devices in which the pattern is transferred from its original insulating base, which may be for instance a nitro-cellulose film readily removable by a solvent, to some other base. Of course, any other material which can easily be stripped from the metal pattern may be used as the original base in a transfer-type device. In one form of such device the metal pattern side of the device can be cemented to a body to be tested, using for instance a heat resisting and insulating cement which does not attack the original base and remains insoluble in the solvent or softener to be employed for removing this base, so that the pattern remains properly secured to the body to be tested even at temperatures high enough to damage the original base of the device. If desired the original base may be removed when the pattern has been cemented to the body to be tested, for instance by dissolving it, or softening it and peeling it off, using a solvent or softener which will not attack the metal pattern or the said cement. A layer of the said cement may be applied as protection over the exposed pattern if desired. These transfer-type devices are of course not confined for use at high temperatures, since they may also have advantages under more normal conditions, because in this way the conductive pattern is brought very close to the body to be tested. Where high temperatures are not likely to be experienced the insulating cement need not be heat resisting.

What I claim as my invention and desire to secure by Letters Patent is:

1. A method of adjusting the ohmic value of an electric resistance device consisting of an insulating base which carries at least one metallic resistance pattern formed from a sheet of metal foil, which method comprises subjecting said metallic pattern to a metal removing treatment reducing the thickness of said pattern.

2. A method as claimed in claim 1 in which said metal removing treatment is performed over substantially the whole area of said pattern, and a finer adjustment of the ohmic value, in the sense of increasing this value, is performed by progressively tinning over at least one selected minor area of said pattern.

3. A method of producing a gauge for supervising a variation of a physical magnitude, comprising the steps of adhering to an insulation base deformable by the variations of the physical magnitude a sheet of bimetal foil, removing portions of one layer of the foil to produce a resistance pattern in the form of a continuous narrow strip adhered to the base in an array of spaced substantially parallel lengths and terminating at both ends in an enlarged terminal portion, and then removing the metal of the other layer of the foil by a metal removing treatment from at least the major part of said pattern, whereby the ohmic value of the strip portion forming said array is highly sensitive to variations in the physical magnitude and the ohmic value of the terminal portions is relatively insensitive to such variations.

4. The method according to claim 3, and comprising the further step of reducing the thickness of the array forming portion of the strip relative to the thickness of the terminal portions of the strip.

5. The method according to claim 3, wherein the metal of said other layer is removed by treatment with an etching medium which attacks said other layer but has no significant effect upon said pattern-forming layer.

References Cited in the file of this patent

UNITED STATES PATENTS

| | | |
|---|---|---|
| 2,336,834 | Bakke | Dec. 14, 1943 |
| 2,457,616 | Van Dyke et al. | Dec. 28, 1948 |
| 2,537,671 | Jack et al. | Jan. 9, 1951 |
| 2,553,762 | Gyuris | May 22, 1951 |
| 2,600,485 | Cox | June 17, 1952 |
| 2,621,276 | Howland | Dec. 9, 1952 |
| 2,662,957 | Eisler | Dec. 15, 1953 |

FOREIGN PATENTS

| | | |
|---|---|---|
| 101,011 | Australia | May 20, 1937 |